United States Patent [19]

Hyodo

[11] Patent Number: 4,719,492

[45] Date of Patent: Jan. 12, 1988

[54] SCAN TYPE ANAMORPHIC MAGNIFYING APPARATUS

[75] Inventor: Haruhiro Hyodo, Toyohashi, Japan

[73] Assignee: Minolta Camera Kabushiki Kaisha, Osaka, Japan

[21] Appl. No.: 895,131

[22] Filed: Aug. 11, 1986

[30] Foreign Application Priority Data

Aug. 13, 1985 [JP] Japan ................................ 60-178295

[51] Int. Cl.⁴ ................................................ G03B 27/68

[52] U.S. Cl. .......................................... 355/52; 355/8; 355/57

[58] Field of Search ..................... 355/52, 76, 8, 11, 57

[56] References Cited

U.S. PATENT DOCUMENTS

| | | | |
|---|---|---|---|
| 4,298,271 | 11/1981 | Sugiura et al. | 355/52 X |
| 4,536,084 | 8/1985 | Tokuhara | 355/57 X |
| 4,650,317 | 3/1987 | Oushiden et al. | 355/52 X |

*Primary Examiner*—Richard A. Wintercorn

*Attorney, Agent, or Firm*—Price, Gess & Ubell

[57] ABSTRACT

The present invention relates to a scan type anamorphic magnifying apparatus capable of a so-called anamorphic magnification for appropriately enlarging or reducing an image of an original document scanned by a slit exposure method through varying a vertical-lateral proportion of the image, and more particularly to the scan type anamorphic magnifying apparatus comprising a first anamorphic optical element including a cylindrical lens and the like having a negative refracting power in a scanning direction and a second anamorphic optical element including a cylindrical lens and the like having a positive refracting power in the scanning direction both of which are provided to be cooperative with each other in a projection optical path extending toward a photosensitive member.

4 Claims, 17 Drawing Figures

SCAN TYPE ANAMORPHIC MAGNIFYING APPARATUS

BACKGROUND OF THE INVENTION

The present invention relates to a scan type anamorphic magnifying apparatus capable of a so-called anamorphic magnification for appropriately enlarging or reducing an image of an original document scanned by a slit exposure method through varying a vertical-lateral proportion of the image, and more particularly to the scan type anamorphic magnifying apparatus comprising a scanning device for scanning the document through a slit in a direction perpendicular to a longitudinal direction of the slit, a photosensitive member shifted at a substantially constant speed in a certain direction, an image forming device for projecting and forming the image of the document scanned by the scanning device on the photosensitive member, speed change means for varying a speed ratio between the scanning speed of the scanning device and the shifting speed of the photosensitive member, and the like whereby the image of the original document is formed, through the working of the speed change means, on the photosensitive member in a proportion different in the scanning direction and the direction perpendicular thereto.

This type of anamorphic magnifying apparatus is utilized, for example, for producing a copy of an original as a printing source in a shape reduced in only one direction in expectation of the elongation of the printing source when it is set on a cylinder of a printing machine or for creating extra space for filing on the copy paper.

More specifically, by setting the magnification through the image forming device to $\beta 1$ and by setting the scanning speed v of the scanning device relative to the shifting speed V of the photosensitive member to:

$$v=v2\ (v2=v/\beta 1\cdot\beta 2)$$

a copy of the original document magnified by $\beta 1\cdot\beta 2$ in the scanning direction and by $\beta 1$ in the direction perpendicular thereto is obtained.

However, since the scanning speed of the image of the document projected on the photosensitive member by the image forming device differs from the shifting speed of the photosensitive member, there may occur a reduction in resolving power due to a slipping in the image of the document formed on the photosensitive member.

This will be more particularly described next with reference to FIG. 10, which schematically shows a state where the image of the document is projected on the photosensitive member.

In this figure, a width of a slit 3 is denoted by d, the magnification through the image forming device I by $\beta 1$ and the scanning speed v relative to the shifting speed V of the photosensitive member 6 is set to ($v=V/\beta 1\cdot\beta 2$). An exposure lamp is not shown.

A point A0 on the document M, when crossed by an end of the slit 3, is projected on a point A relative to the photosensitive member 6. The point A0 on the document M, when crossed by the other end of the slit 3 with the movement of the scanning device, is projected on a point A' relative to the photosensitive member 6. That is to say, the image of the point A0 projected on the photosensitive member 6 is shifted from A to A' with the scanning operation. The shifting distance D1 is represented by a length of the slit width d magnified by $\beta 1$:

$$D1=\beta 1\cdot d$$

Whereas, a point B corresponding to the point A and on the photosensitive member 6 shifted at the speed V is shifted to a point B'. This shifting distance DD is derived from the following equation:

$$\begin{aligned} DD &= (d/v)\cdot V \\ &= \{d/(V/\beta 1\cdot\beta 2)\}\cdot V \\ &= \beta 1\cdot\beta 2\cdot d \end{aligned} \qquad (1)$$

Thus, DD differs from the shifting distance D1 of the projected image. This difference Δ between the above two shifting distances D1 and D2:

$$\begin{aligned} \Delta &= DD - D1 = \beta 1\cdot\beta 2\cdot d - \beta 1\cdot d \\ &= \beta 1\cdot d\cdot(\beta 2 - 1) \end{aligned} \qquad (2)$$

causes the resolving power reduction in the image formed on the photosensitive member 6.

In order to solve this problem, there is known construction comprising an anamorphic optical element such as a cylindrical lens having a refracting power only in a direction corresponding to the scanning direction and disposed in a projection optical path extending toward the photosensitive member thereby to equate the shifting distance of the image projected on the photosensitive member and the shifting distance of the portion of the image on the photosensitive member corresponding thereto.

However, according to the above-described conventional construction, although the resolving power reduction due to the difference between the scanning speed of the document and the shifting speed of the photosensitive member reduces, there occurs a disagreement between focal planes relative to the scanning direction and to the direction perpendicular thereto. This problem will be more specifically described next with reference to FIGS. 8(*a*), (*b*) and FIGS. 9(*a*), (*b*).

Referring to FIGS. 8(*a*) and 8(*b*), in this case, a cylindrical lens 7*c* biconvex in section by way of example of the anamorphic optical element having the refracting power in the direction corresponding to the scanning direction, is disposed in the projection optical path extending toward the photosensitive member 6. As shown in FIG. 8(*a*), the cylindrical lens 7*c* having a positive refracting power in the slit width direction, i.e. the direction corresponding to the scanning direction ( the vertical direction in the same figure) causes the focal plane FS1 of the projection light from the image forming device I to shift close to a photosensitive member surface 6*a* by δ1.

At the same time, the cylindrical lens 7*c*, when acting as a parallel flat plane in the longitudinal direction of the slit, causes the focal plane FS2 of the projection light from the image forming device I to shift away from the photosensitive member surface 6*a* by δ2.

If the cylindrical lens 7*c* is provided with a large refracting power in order to enlarge the vertical to lateral magnification of the formed image, i.e. the anamorphic magnification, these two focal planes FS1 and FS2 are displaced in mutually opposite directions relative to the photosensitive member surface 6*a*, whereby either of the focal planes, FS1 or FS2, or the both FS1 and FS2 may not be confined within a focal depth. If this happens, the image formed on the photosensitive member 6 is blurred.

In the next case, a cylindrical lens 7*d* biconcave in section is disposed in the projection optical path extending toward the photosensitive member 6. Referring now to FIG. 9(*a*), the cylindrical lens 7*d* having a negative refracting power in the slit width direction, i.e. the direction corresponding to the scanning direction (the vertical direction in the same figure) causes the focal plane FS3 of the projection light from the image forming device I, in contrast to the previous case, to shift away from the photosensitive member surface 6*a* by δ3. At the same time, in the longitudinal direction of the slit, as shown in FIG. 9(*b*), the lens 7*d*, acting similarly to the previous case, causes the focal plane FS4 to shift away from the photosensitive surface by δ4.

In this case, in contrast to the previous case employing the cylindrical lens 7*c* having the positive refracting power, the directions of the displacements of the two focal planes FS3 and FS4 agree with each other. Thus, it is possible to reduce the mal-effect caused by the displacements of the focal planes by adjusting the distance between the photosensitive member 6 and the image forming device I as to permit the photosensitive member surface 6*a* to be disposed in a middle position between the focal planes FS3 and FS4. However, in this case also, if the cylindrical lens 7*d* has a large refracting power in order to enlarge the anamorphic magnification, the distance between the focal planes FS3 and FS4 may not be confined within the focal depth and the image formed on the photosensitive member 6 is blurred.

SUMMARY OF THE INVENTION

The object of the present invention is, taking the above problems in consideration, to provide a construction for forming the image in a different proportion in the scanning direction and in the direction perpendicular thereto where the large anamorpyhic magnification does not readily sacrifice the resolving power reduction nor causes the blurring in the image formed on the photosensitive member and further the anamorphic magnification may be variable to a large extent advantagenously.

In order to accomplish the above object, the scan type anamorphic magnifying apparatus according to the present invention is characterized in that a first anamorphic optical element having a negative refracting power in the scanning direction and a second anamorphic optical element having a positive refracting power in the scanning direction are provided to be cooperative with each other in the projection optical path extending toward the photosensitive member.

More particularly, the second anamorphic optical element having a positive refracting power in the scanning direction, as represented by the cylindrical lens 7*c* biconvex in section in FIG. 8(*a*), causes the focal plane FS1 of the projection light from the image forming device 1 to move from the photosensitive member surface 6*a* toward the image forming device I.

On the other hand, the first anamorphic optical element having a negative refracting power in the scanning direction, as represented by the cylindrical lens 9*d* concave in section in FIG. 9(*a*), causes the focal plane FS3 of the projection light from the image forming device I to move away from the photosensitive member surface 6*a*.

That is to say, by providing the first and second anamorphic optical elements having the positive and negative refracting powers to be cooperative with each other, the difference between the scanning direction and the direction perpendicular thereto of the focal planes is offset against the scanning direction whereby the focal planes of the projection light from the image forming device may be confined within the focal depth. With this construction, it may be conceived that the displacements of the focal planes increase as the displacement directions of the focal planes of the projection light from the image forming device agree with each other in the direction perpendicular to the scanning direction, i.e. the direction longitudinal of the slit. In practice, however, the displacement of the focal plane in the longitudinal direction of the slit is very small in comparison with the displacement of the focal plane in the scanning direction thus the displacements are practically negligible if they combine.

Further, if the positive and the negative refracting powers of the two anamorphic optical elements are appropriately arranged, it is possible to permit the focal planes of the projection light from the image forming device in the scanning direction to substantially agree with the displaced positions of the focal planes of the projection light from the image forming device in the direction longitudinal of the slit, whereby it becomes also possible to adjust the distance between the photosensitive member and the image forming device such that these agreed focal planes comform with the photosensitive member surface.

Consequently, even with a large anamorphic magnification, the focal planes of the projection light from the image forming device may be confined within the focal depth in the vicinity of the photosensitive member surface and an image of good quality largely free from the resolving power reduction and the blurring effect may be obtained.

Moreover, as discussed in the initial portion of this specification, this scan type anamorphic magnifying apparatus is often used, for example in producing the copy of base paper for printing, for obtaining the anamorphically magnified copy, as the printing source, of the original document in a shape reduced in one direction. In such a case, the apparatus need be capable of varying the anamorphic magnification in response to a difference in the elongation amount of the base paper depending on the kind of printer employed and this function will be useful also for other purposes.

In order to meet this need, it is possible to provide an anamorphic magnification change mechanism for varying the relative distance between the first and the second anamorphic optical elements.

By appropriately varying the relative distance between the two anamorphic optical elements, the anamorphic magnification becomes freely variable while maintaining the focal planes of the projection light from the image forming device in the vicinity of the photosensitive member surface, and the image anamorphically magnified in various proportions while retaining good quality is readily obtainable.

BRIEF DESCRIPTION OF THE DRAWINGS

The accompanying FIGS. 1 through 7 illustrate embodiments of a scan type anamorphic magnifying apparatus related to the present invention, in which:

FIG. 1 is a schematic sectional view of a copy machine;

FIG. 2 is a perspective view of an anamorphic lens unit;

FIGS. 3(*a*) and 3(*b*) are sectional views showing a projection and a retraction of the anamorphic lens unit;

FIG. 4(*a*) is a plan view of an original document;

FIG. 4(*b*) is a sectional view showing a formation of an image;

FIG. 4(*c*) is a plan view of the image projected on a photosensitive member during the image formation shown in FIG. 4(*b*);

FIG. 5(*a*) is a sectional view showing another image formation;

FIG. 5(*b*) is a plan view of the image projected on the photosensitive member during the image formation shown in FIG. 5(*a*);

FIG. 6(*a*) is a sectional view of still another image formation;

FIG. 6(*b*) is a plan view of the image projected on the photosensitive member during the image formation shown in FIG. 6(*a*);

FIG. 7 is a plan view showing the image formation;

FIG. 8(*a*) and FIG. 9(*a*) are sectional views of image formations;

FIG. 8(*b*) and FIG. 9(*b*) are plan views showing the image formations of FIG. 8(*a*) and FIG. 9(*a*) respectively.

DETAILED DESCRIPTION OF THE PREFERRED EMBODIMENTS

The preferred embodiments of the present invention will be described hereinafter with reference to the accompanying drawings.

Figure 1:
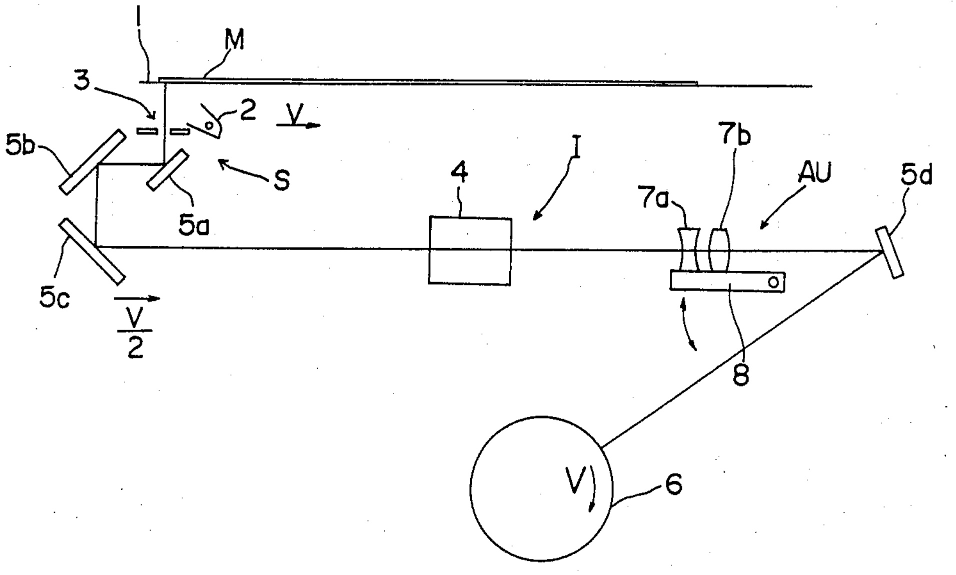

FIG. 1 schematically shows a construction of a scan type anamorphic magnification apparatus according to the present invention as embodied in a copy machine.

An original document M set on a document table 1 made of glass of the like is illuminated by means of an exposure lamp 2, and a light reflected from the original document M passes through a slit 3 and then is projected through an image forming device I comprising an image forming lens 4 and a plurality of mirrors **5*a* through 5*d* and the like onto a photosensitive drum 6. The exposure lamp 2, the slit 3 and the first mirror 5*a* by way of example of a scanning device S, are driven by a DC motor (not shown) at a speed v to be shifted in the right direction shown thereby to scan the document M. The second mirror 5*b* and the third mirror 5*c*** are driven by the same DC motor at a speed v/2 half of the speed v of the scanning device S to be shifted in the right direction shown, such that the image forming device I may maintain a constant optical path length for forming the image.

The image of the document M scanned by the scanning device S is formed as an electrostatic latent image on the photosensitive drum 6 by way of example of a photosensitive member which is rotated clockwise by means of a motor (not shown) different from the one for the ssanning device S.

The following copying operation of the original document M, though not shown, succesively undergoes for its completion a developing process for transforming the electrostatic latent image into a toner image, a transferring process for transferring the toner image onto a recording material and an impressing process for impressing the toner image on the recording material.

This copy machine selectively provides two image forming modes.

Specifically, with a selection of a first image forming mode, an anamorphic magnification $\beta 2$ for varying a vertical-lateral proportion is set to 1.0 and a magnification of the image forming device I is set to 1.0 and at the same time the scanning speed v is equated with a rotational speed V of the photosensitive drum 6, whereby an ordinary real-sized copy of the original M is obtained. Further, with this mode, the magnification of the image forming device I is set to $\beta 1$ by varying a conjugate length through a right and left movement of the image forming lens 4 and the fourth mirror **5*d* by means of the stepping motor and at the same time by setting the scanning speed v of the scanning device S to v1 relative to the shifting speed V of the photosensitive drum 6**:

$$v = v1 \; (v1 = v/\beta 1)$$

therby to permit the drum 6 to be shifted in appropriate response to a length of the projected image thereon, a copy of the original document M magnified by $\beta 1$ is obtained.

With a selection of the second image forming mode, if the magnification of the image forming device I is set to $\beta 1$ and the scanning speed v relative to the shifting speed V of the photosensitive drum 6 is set to v2:

$$v = v2 \; (v2 = v/\beta 1 \cdot \beta 2)$$

an anamorphically magnified copy of the document M magnified by $\beta 1 \cdot \beta 2$ in the scanning direction and by $\beta 1$ in the direction perpendicular to the scanning direction is obtained. In other words, by varying the speed ratio between the scanning speed v of the scanning device S and the shifting speed v of the photosensitive member 6 by means of speed change means (not shown) or by varying the scanning speed v by means of the speed change means, the above anamorphic magnification copying operation is effected.

In carrying out this anamorphic copying operation, however, there occasionally occurs reduction in resolving power due to a slipping of the image of the document M formed on the photosensitive drum 6. More particularly, the resolving power reduction of the image formed on the drum 6 results from a difference between a projected width of a width d of the slit 3 magnified by $\beta 1$, i.e. a shifting distance D1 of the projected image:

$$D1 = \beta 1 \cdot d \tag{3}$$

and a shifting distance DD of the photosensitive drum 6 shifted at the speed V while the slit 3 is scanned:

$$\begin{aligned} DD &= \{d/(V/\beta 1 \cdot \beta 2)\} \cdot V \\ &= \beta 1 \cdot \beta 2 \cdot d \end{aligned} \tag{4}$$

With the first image forming mode, the anamorphic magnification $\beta 2$ being 1.0, the slipping of the image does not occur. On the other hand, with the second image forming mode, the resolving power reduces in response to a value of $\beta 2$.

Thus, the copy machine including the scan type anamorphic magnification apparatus embodying the present invention, comprises, as shown in FIG. 1, an anamorphic magnification apparatus embodying the present invention, comprises, as shown in FIG. 1, an anamorphic lens unit AU having the magnification β2 only in the scanning direction in the projection optical path extending from the image forming device I to the photosensitive drum 6. The copy machine further comprises a unit position switching mechanism UC for retracting this anamorphic lens unit AU into a position where the unit does not refract the projecting light in the first image forming mode and for shifting the unit AU into a position where the unit does refract the projecting light in the second image forming mode.

Specifically, in the second image forming mode, as the anamorphic lens unit AU having the magnification β2 in the scanning direction acts on the projection optical path, the shifting distance D1 of the projected image becomes:

$$D1=\beta1\cdot\beta2\cdot d$$

which is equivalent to the shifting distance DD of the photosensitive drum 6 represented by the equation (4), whereby the image formed on the drum 6 does not suffer the resolving power reduction.

The anamorphic lens unit AU, as illustrated in FIGS. 1 through 7, comprises a cylindrical lens 7a biconcave in section (which will be referred to as the cylindrical concave lens hereinafter) which is an example of a first anamorphic optical element having a negative refracting power in the direction along the scanning direction and a cylindrical lens 7b biconvex in section (which will be referred to as the cylindrical convex lens hereinafter) which is an example of a second anamorphic optical element having a positive refracting power in the same direction.

This anamorphic lens unit AU comprising the above two cylindrical lens 7a and 7b will be more particularly described next.

As described above, by providing the anamorphic optical element having the magnification β2 only in the direction along the scanning direction, the resolving power reduction due to the difference between the shifting distance D1 of the projected image in the course of the scanning operation and the shifting distance DD of the photosensitive drum 6 is avoidable. However, if only one of the cylindrical concave lens and the cylindrical convex lens is employed, there occurs a problem that two focal planes corresponding to the direction along the scanning direction and the direction perpendicular thereto do not conform with each other.

In order to solve this problem, the copy machine including the scan type anamorphic magnification apparatus according to the present invention employs both the first cylindrical concave lens 7a having the negative refracting power in the direction along the scanning direction and the second cylindrical convex lens 7b having the positive refracting power in the same direction, cooperatively to offset the difference between the scanning direction of the focal planes and the direction perpendicular thereto, whereby the focal planes of the projection light from the image forming device I may be confined within the focal depth.

The copy machine further includes an anamorphic magnification variation mechanism MC for freely varying the magnification by changing a relative distance between the two cylindrical lens 7a and 7b. More specifically, the cylindrical concave lens 7a is fixedly positioned relative to the anamorphic lens unit AU and the cylindrical convex lens 7b disposed between the cylindrical concave lens 7a and the photosensitive drum 6 is variablly positionable relative to the anamorphic lens unit AU toward an optical axis of the projection light.

Figure 4A:
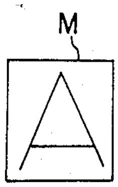
Figure 4B:
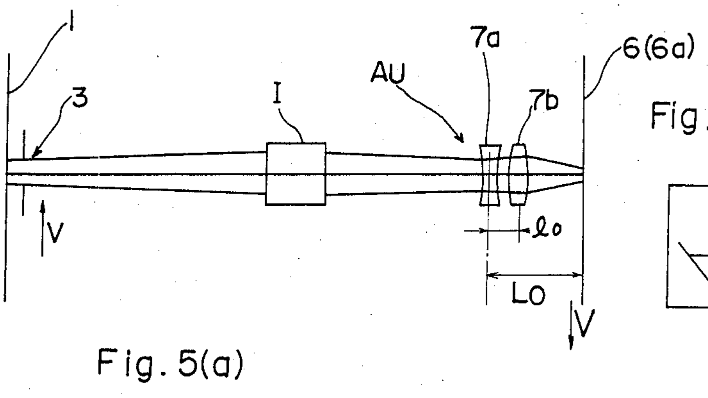
Figure 4C:
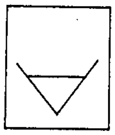
Figure 5A:
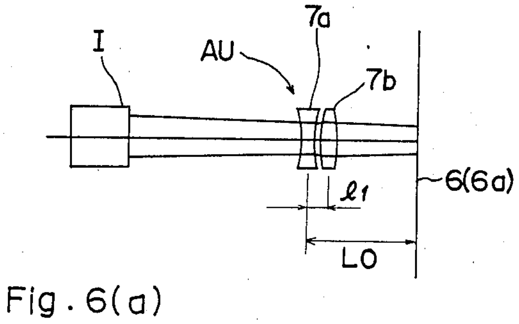
Figure 5B:
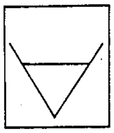
Figure 6A:
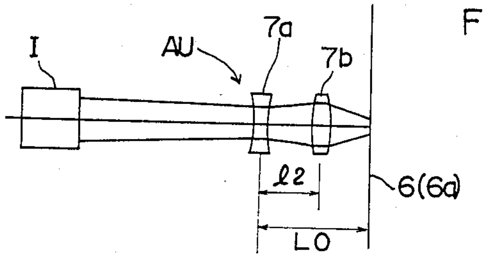
Figure 6B:
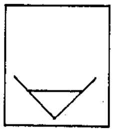
Figure 7:
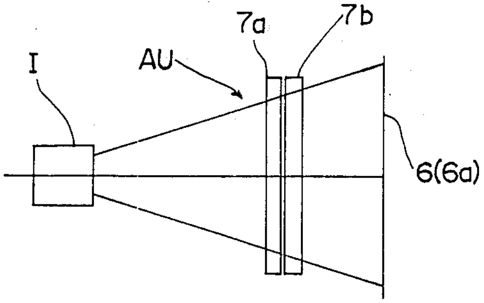
Figure 8A:
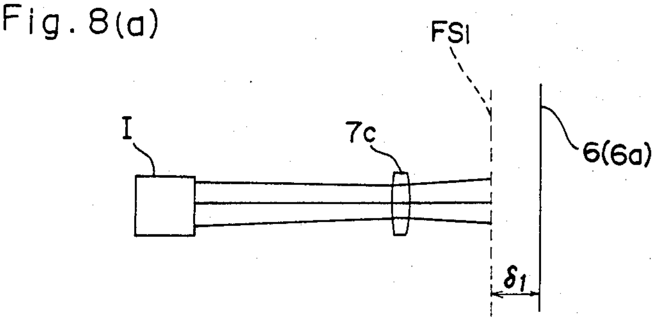
FIGS. 8(*a*), (*b*) and FIGS. 9(*a*), (*b*) show conventional embodiments.
Figure 8B:
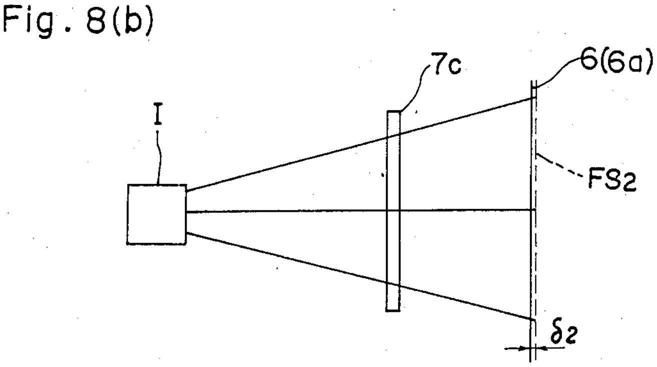
Figure 9A:
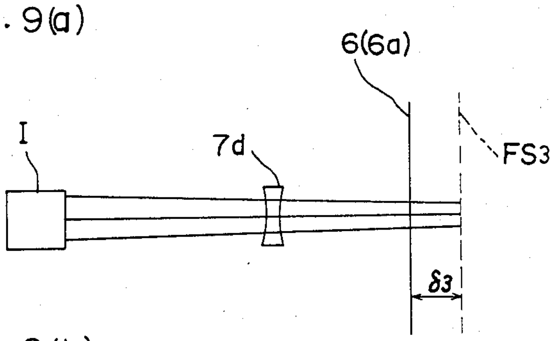
Figure 9B:
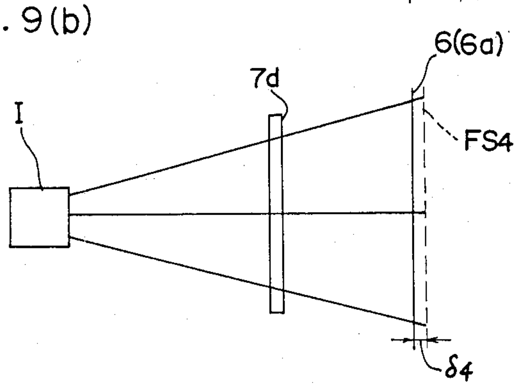
Figure 10:
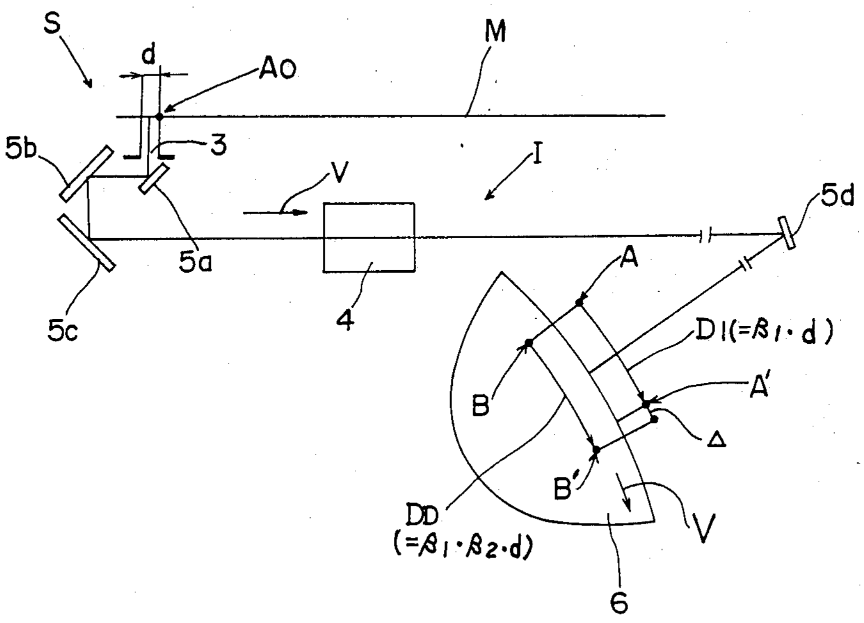
FIG. 10 is a view descriptive of an anamorphic image formation.

FIGS. 4 through 6 schematically illustrate how the image is variablly formed in accordance with a position change of the cylindrical convex lens 7b.

Referring to FIGS. 4(b), 5(a), and 6(a), the image forming device I is shown as a unit comprising the image forming lens 4 and the four mirrors 5a through 5d, and the cylindrical concave lens 7a is fixedly positioned away from the outer surface 6a of the photosensitive drum 6 by a predetermined distance LO.

In FIG. 4(b), the cylindrical convex lens 7b is set apart from the cylindrical concave lens 7a by a certain distance 10. In this state, an image of the original document M placed on the document table 1 shown in FIG. 4(a) is formed, as shown in FIG. 4(c), on the surface 6a of the photosensitive drum 6 which is shifted at the speed V in the downward direction shown while the slit 3 and the exposure lamp (not shown in this figure) are scanned at the speed v in the upward direction shown.

FIG. 5(a) illustrates a state where the cylindrical convex lens 7b is shifted toward the cylindrical concave lens 7a therefrom. In this state, a distance 11 between the cylindrical lens 7a and 7b is shorter than the distance 10 shown in FIG. 4(b), whereby the image of the document M, shown in FIG. 4(a), as formed on the surface 6a of the photosensitive drum 6 is lengthened in the scanning direction compared with the image shown in FIG. 4(c).

On the other hand, FIG. 6(a) shows a state where the cylindrical convex lens 7b is shifted toward the drum 6 from the state shown in FIG. 4(b). In this state, a distance 12 between the cylindrical lens 7a and 7b is longer than the distance 10 shown in FIG. 4(b), the image of the original document M, shown in FIG. 4(a), as formed on the surface 6a of the drum 6 is shortened compared with the image shown in FIG. 4(c).

It is to be noted here that the above described variation range of the magnification is so predetermined as to permit the displacements of the focal planes to be confined within the focal depth with any shifting amount of the cylindrical convex lens 7b.

Hereinafter will be described constructions for projecting and retracting the anamorphic lens unit AU into and from the projection optical path and for varying the relative distance between the two cylindrical lens 7a and 7b constituting this anamorphic lens unit AU, respectively.

Figure 2:
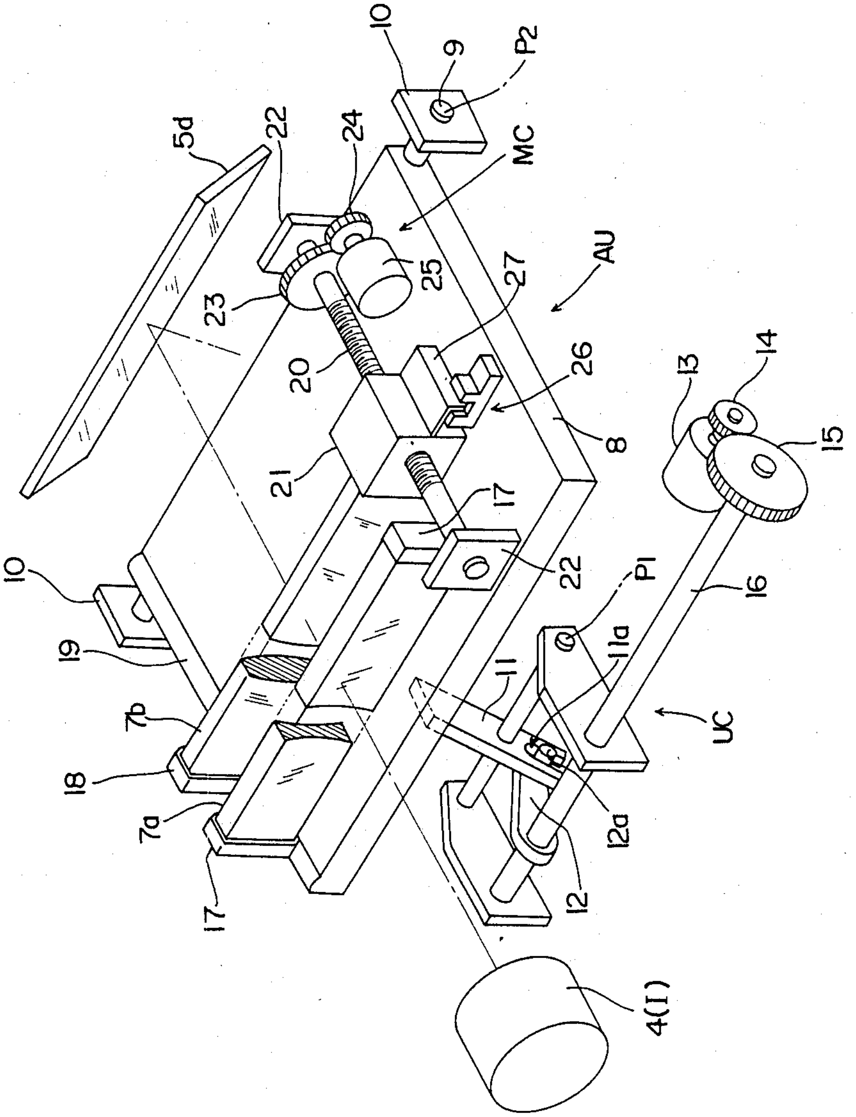

Referring to FIG. 2, the anamorphic lens unit AU disposed between the image forming lens 4 and the fourth mirror 5d comprises a base plate 8 and the cylindrical concave lens 7a and the cylindrical convex lens 7b mouted thereon in tandem with each other.

A support shaft 9 fixedly attached to this base plate 8 is supported by means of a pair of support frames 10 fixed to a body of the copy machine (not shown). The base plate 8, on its under surface, is touched by one end of a first link 11 freely rotatable on an axis P1. The first link 11 defines on the other end thereof a cutout portion 11a, which is engaged with a top end of a second link 12 by means of a pin 12a. This second link 12 is linked, through its base end, with a control shaft 16 operatively connected through two gears 14, 15 to the stepping motor 13. That is to say, with a normal rotation of this stepping motor 13, the anamorphic lens unit AU together with the base plate 8 is rotated on an axis P2 of the support shaft 9.

Figure 3A:
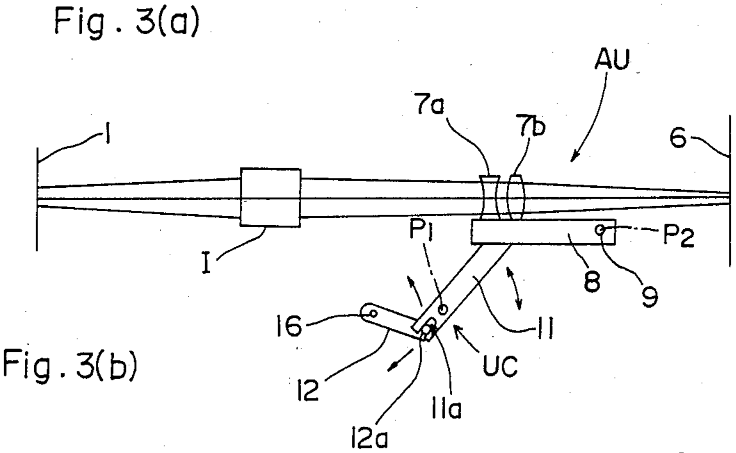
Figure 3B:
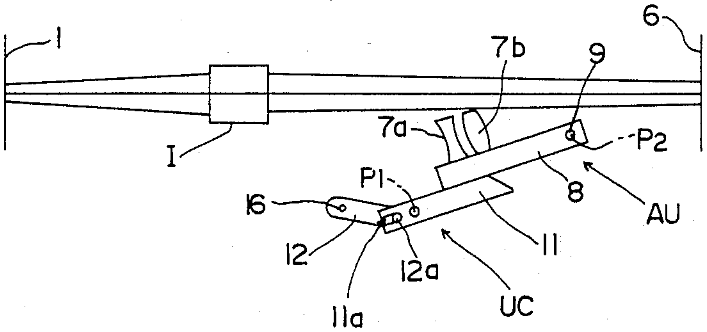

This rotational movement of the anamorphic lens unit AU will be more particularly described next with reference to FIGS. 3(*a*) and 3(*b*). As described hereinbefore, in the second image forming mode, the anamorphic lens unit AU is positioned to exert its refracting power on the projection light as seen in FIG. 3(*a*). FIG. 2 also perspectively shows this state. In this state, a vertical beam center of the projection light travelling from the image forming lens 4 to the photosensitive drum 6 is adapted to conform with a vertical center of the two cylindrical lens *7a* and *7b*.

For switching from this state to the first image forming mode, the stepping motor 13 is rotated clockwise by a predetermined angle as shown in FIG. 2. This rotates the top end of the second link 12 upwardly and then to lift the end of the first link 11, whereby the anamorphic lens unit AU operatively connected to the other end of the first link 11 is rotated counterclockwise on the axis P2 in the same figure. Consequently, as shown in FIG. 3(*b*), both of the cylindrical lens *7a* and *7b* are retracted from the projection optical path extending from the image forming device I to the photosensitive drum 6.

For switching from the first image forming mode to the second image forming mode, the stepping motor 13 is rotated by a predetermined angle counterclockwise in FIG. 2. This, in contract to the previous case, causes the two cylindrical lens *7a* and *7b* to shift into the projection optical path, as shown in FIG. 3(*a*).

Thus, the stepping motor 13, the two gears 14, 15, the control shaft 16 and the two links 11, 12 togetherwith constitute a unit switching mechanism UC.

Referring back to FIG. 2, the cylindrical concave lens *7a* is outwardly secured by means of a pair of holders 17 fixedly mounted on the base plate 8, whereas the cylindrical convex lens *7b* is mounted, by means of a holder 18 holding one end thereof, on a rail 19 defined on an upper face of the base plate 8 to be freely slidable thereon along the directions of the optical axis of the projection light. The other end of the cylindrical convex lens *7b* is supported by means of a lens shifting table 21 threaded onto a malc screw 20. This male screw 20 is axially supported by means of a support frame 22 fixed to the base plate 8 and is operatively connected to a stepping motor 25 through two gears 23, 24.

With a normal rotation of this stepping motor 25, the cylindrical convex lens *7b* is shifted toward the optical axis of the projection light and the relative distance between the cylindrical convex lens *7b* and the cylindrical concave lens *7a* is changed, whereby the anamorphically magnified image may be formed in varied proportions, as described hereinbefore. Thus, the stepping motor 25, the two gears 23, 24, the male screw 20 and the lens shifting table 21 constitute the anamorphic magnification variation mechanism MC.

The lens shifting table 21 is provided integrally with a detection portion 27 which is movable together with the table between a light emitting portion (not shown) and a light receiving portion (not shown) of a photo detector 26 mounted on the base plate 8. That is, according to output singals sent from this photodetector 26, it may be detected whether the cylindrical convex lens *7b* is placed in a standard position or not.

In the foregoing embodiment, the variation range of the magnification is adapted to permit the displacements of the focal planes relative to the longitudinal direction of the slit to be confined within the focal depth with any shifting amount of the cylindrical convex lens *7b*, thus neither of the cylindrical lens *7a* and *7b* has a curvature along the direction longitudinal of the slit. When the displacement of the focal plane relative to the longitudinal direction of the slit may exceed the focal depth with an increase of the anamorphic mangnification, it is possible to compensate the displacement if a face of the cylindrical convex lens *7a* longitudinal of the slit is provided with an appropriate curvature or if a length of the image forming optical path is appropriately modified depending on an amount of the magnification.

Also, the foregoing embodiment employs the single cylindrical concave lens *7a* and the single cylindrical convex lens *7b*, but in embodying the present invention these may be replaced with a plurality of the anamorphic optical elements. Further, it is possible to fix the anamorphic optical element *7b* having the positive refracting power and to shift the anamorphic optical element *7a* having the negative refracting power, or to shift the both *7a* and *7b* simultaneously.

The forward and rearward relationship between the two anamorphic optical elements *7a*, *7b* relative to the optical axis of the projection light and further the positional arrangement of these elements *7a*, *7b* are both readily modifiable. For instance, the anamorphic optical elements *7a* and *7b* may be disposed closer to the original document M than to the image forming lens 4, or respectively disposed forwardly and rearwardly across the image forming lens 4.

What I claim is:

1. a scan type anamorphic magnifying apparatus, comprising;

a scanning device for scanning through a slit an original document in a direction perpendicular to a longitudinal direction of said slit, a photosensitive member shifted in a certain direction at a substantially constant speed, an image forming device for projecting and forming an image of said original document scanned by said scanning device on said photosensitive member, a speed change means for varying a speed ratio between the scanning speed of said scanning device and the shifting speed of said photosensitive member in order to permit the image of the original document to be formed on said photosensitive member by a magnifications different in the scanning direction and in the direction perpendicular thereto respectively, a first anamorphic optical element having a negative refracting power in the scanning direction and disposed in a projection optical path extending toward said photosensitive member, a second anamorphic optical element having a positive refracting power and disposed in the projection optical path extending toward said photosensitive member, and an anamorphic magnification change mechanism for varying a relative distance between said first and second anamorphic optical elements.

2. A scan type anamorphic magnifying apparatus as defined in claim 1 wherein said first and second anamorphic optical elements comprise cylindrical lens.

3. A scan type anamorphic magnifying apparatus as defined in claim 1 further comprising a switching mechanism for projecting and retracting in unison said first and second anamorphic optical elements into and from the projection optical path extending toward said photosensitive member.

4. A scan type anamorphic magnifying apparatus, comprising:

a scanning device for scanning, through a slit, an original document in a direction perpendicular to a direction longitudinal of said slit;

a photosensitive member shifted in a certain direction at a substantially constant speed;

an image forming device for forming an image of said original document scanned by said scanning device on said photosensitive member;

means for varying a speed ratio between the scanning speed of said scanning device and the shifting speed of said photosensitive member in order to permit the image of the original document to be formed on said photosensitive member by magnifications different in the scanning direction and in a direction perpendicular thereto, respectively;

a first anamorphic optical element having a negative refracting power in the scanning direction and disposed in an optical path extending toward said photosensitive member;

a second anamorphic optical element having a positive refracting power and disposed in an optical path extending toward said photosensitive member; and an anamorphic magnification change mechanism for varying a relative distance between said first and second anamorphic optical elements.

* * * * *